United States Patent [19]
Kempf

[11] Patent Number: 5,538,101
[45] Date of Patent: Jul. 23, 1996

[54] ADJUSTABLE, PORTABLE COMBINATION TREE STAND

[76] Inventor: James J. Kempf, 2005 Cambridge Dr., Coralville, Iowa 52241

[21] Appl. No.: 168,758
[22] Filed: Dec. 16, 1993
[51] Int. Cl.⁶ ...................................................... A45F 3/26
[52] U.S. Cl. ........................... 182/116; 182/187; 182/204
[58] Field of Search ...................................... 182/187, 188, 182/116, 206, 204

[56] References Cited

U.S. PATENT DOCUMENTS

| | | | |
|---|---|---|---|
| 2,808,975 | 10/1957 | Palmquest | 182/120 X |
| 2,888,225 | 5/1959 | McQuinn | 248/237 |
| 3,858,684 | 1/1975 | Goings | 182/207 |
| 4,009,763 | 3/1977 | Hunter | 182/187 |
| 4,579,198 | 4/1986 | Lee | 182/187 X |
| 4,721,183 | 1/1988 | Koniecka | 182/187 |
| 4,727,961 | 3/1988 | Dawson | 182/187 |
| 4,802,552 | 2/1989 | Williams | 182/187 |
| 4,890,694 | 1/1990 | Williams | 182/187 |
| 5,009,283 | 4/1991 | Prejean | 182/116 |
| 5,016,732 | 5/1991 | Dunn | 182/116 |
| 5,016,733 | 5/1991 | Bradley | 182/187 |
| 5,086,874 | 2/1992 | Treants | 182/136 |

FOREIGN PATENT DOCUMENTS

| 1015336 | 8/1977 | Canada | 182/204 |
|---|---|---|---|

OTHER PUBLICATIONS

Loc–On Co. Inc., Warren & Sweat, Amacken, & Cabela.

Primary Examiner—Alvin C. Chin-Shue

[57] ABSTRACT

A hunter's tree stand with a platform detachably mounted to an upright mounting bracket which mounts to a tree trunk. A supporting arm pivots about the lower end of the mounting bracket and may be attached at various points long the platform to allow the platform to be leveled. The platform has wing extensions which may be folded around hinges. The platform may be easily removed from the mounting bracket or folded up against the tree. A ladder which may be disassembled for transport, is attachable to the platform. Leveling extensions are provided on the legs of the ladder. An optional seat assembly is provided. An alternative embodiment provides a platform fixed to a ladder member, for use as a ladder stand.

6 Claims, 10 Drawing Sheets

FIG 15  FIG 16

ADJUSTABLE, PORTABLE COMBINATION TREE STAND

BACKGROUND Of THE INVENTION

The present invention pertains to portable platforms used by hunters which may be attached to tree trunks to provide a platform on which a hunter may sit or crouch to await or spot game in a wooded area.

It is well known that it is desirable to hunt certain game from an elevated position above the forest or woodland floor. The elevated position provides an improved view for spotting approaching target game. Also, some species of game are more alert to dangers at ground level and are less likely to observe an elevated hunter.

Elevated platforms for hunters are available in three general types, namely those which are free standing, those which mount to a tree trunk, and those which are fixed to ladder members and which are intended to be leaned against the tree and supported by both tree and ladder member.

Those hunters' platforms intended to be fastened to tree trunks are generally referred to as tree stands and commonly provide a generally horizontal platform which abuts the tree and is mounted thereto by upwardly extending brackets which may extend around the tree trunk or which may be held to the tree by hooks, chains or straps. Examples of such tree stands are illustrated in U.S. Pat. Nos. 5,016,733, 4,727,961, 4,890,694, and 4,802,552, and others which can be found in hunter's goods catalogs and supply stores.

One drawback that these fixed position stands have is that if an individual wishes to put a fixed position stand in a tree that is not virtually vertical, the platform will not be level to stand on, thus creating a hazard. Another drawback to most fixed position tree stands is that if an individual wishes to frequent different locations, the user must remove the entire tree stand and relocate it, thus taking a great deal of time and effort, as well as making a great deal of noise.

One tree stand that does offer some limited flexibility to move from one tree to another is the Vantage Point™ tree stand by Trailhawk Treestands, illustrated in U.S. Pat. No. 4,708,221. Although easier to mount than other fixed position stands, this stand mounts to the tree by a threaded mounting pin, which by nature damages the tree. This damaging feature is not desirable and also is not allowed on many lands. Another drawback to the Vantage Point™ tree stand is that it too can only be used in virtually vertical trees in order to have the platform remain level. Another drawback to this stand is that an additional strap must be put around the tree in order to give extra stability, although this design is susceptible to rocking or tipping when the user shifts weight.

In each of the known tree stands, no simple-to-operate, inexpensive means is provided to allow the adjustment of the platform such that it may be maintained in a generally horizontally level position regardless of the angle of the tree trunk to which the tree stand is attached. The known tree stands depend on the user's choosing a substantially vertical tree having a trunk area at the desired height which is free of limbs.

Another familiar hunters' platform is the ladder stand which incorporates a ladder to provide support for the platform as it rests against a tree. Securing means is provided for the platform to retain it to the tree but the ladder provides support as well as access to the platform.

Ladder stands such as those described in U.S. Pat. Nos. 4,905,792, 5,009,283, and 5,106,732 are relatively easy to install, but limit the height which the individual can reach in the tree, and have the additional limitation that they can be seen from a great distance by unwanted individuals. Another drawback to these types of stands is that they are susceptible to theft or use by others and must be taken out of the field for these problems to be avoided.

In the case of known ladder stands, again no adjustment means is provided to allow leveling of the platform, nor is any provision made for easy removal of the ladder member after the stand is fixed to the tree.

SUMMARY OF THE INVENTION

The disclosed tree stand has two alternative mounting brackets, one that is permanently attached to the platform and one that is separate from the platform. These brackets may be mounted on virtually any tree no matter how large in diameter, as long as the tree is of sufficient size to support the user. The stand may be mounted to trees that are not essentially vertical due to the leveling features of the stand as a whole. The mounting bracket which is separate from the platform has a notch near its top where the platform engages the bracket, and numerous notches near the bottom where the support bars engage it. These lower notches contribute to the adjustable leveling characteristics of this tree stand.

In an alternative embodiment a permanent mounting bracket is used which is similar to the separate bracket, except where the separate bracket has notches, the permanent bracket has holes. Either mounting bracket may be mounted to the tree in a plurality of ways, including, but not limited to bolting to the tree, or by retention by a chain and turnbuckle or a strap. An individual may opt to purchase numerous separate mounting brackets and position them in different trees, allowing attachment of the platform to the bracket mounted in the tree preferred for hunting on a given day or time. It is therefore one object of this invention to provide a tree stand with a separate mounting bracket that may be used in virtually any tree, and on any lands, public or private, due to the flexibility of mounting choices.

The platform is comprised of a plurality of structural elements designed to support the individual and the accompanying gear. The platform has a base structure adequate in size to comfortably support an individual, and optional additional smaller platforms that are attached to either side of the base structure by a hinge mechanism, thus creating a larger platform. The platform also has a rod that engages the top of the mounting bracket, such that the platform may be folded up to and about the tree to blend into the profile of the tree, or it may be folded down for use. The platform structure also has an optional seat structure, designed to provide a comfortable waiting position for the individual. It is therefore another object of this invention to offer a tree stand that has adjustability in the size of its platform, and a tree stand, that when not is use, may be left in the tree, folded up to and about the tree.

The support bars that mount to the platform structure are designed to provide the adjustable leveling feature of the platform. After mounting the bracket to the tree, the rod at the end of the platform structure is engaged in the upper notch of the mounting bracket. After having done this, the user may choose which notch in the lower mounting bracket to engage a rod transversely joining support bars. Finally, the desired notch in the variable position leveling bracket is chosen.

For the permanently attached mounting bracket version, the individual mounts the bracket to the tree, and then may adjust the platform to a level position by choosing the appropriate position of the leveling bracket. It is therefore another object of this invention to provide a tree stand that may be mounted in virtually any tree, and which has a platform which may be leveled by the individual to compensate for the angle of the tree.

The ladder member of the invention consists of a plurality of sections of equal or near equal length that are assembled to make a longer ladder of typical design. At the top of the top section are brackets that contribute to the flexibility of this tree stand. At the bottom are adjustable feet. When mounted to a platform to be used as a fixed position stand, the ladder is held in position by mounting the top bracket to the front edge of the platform, thus securing the ladder. Independently extensible legs are provided to compensate for the contour of the land. The user may choose to leave the ladder in position, or to remove the ladder, thus making the platform inaccessible to others.

When it is desired to use the stand as a ladder stand, the adjustable support rods are removed and the free end of the platform and the brackets at the top of the ladder are bolted together. Support braces are bolted to the mid section of the platform and the ladder. It is therefore another object of this invention to offer a tree stand that may be left in position while unattended, but inaccessible.

It is a further object of this invention to offer a tree stand that may be used as either a fixed position tree stand or as a ladder stand.

DETAILED DESCRIPTION OF THE INVENTION

Figure 1:
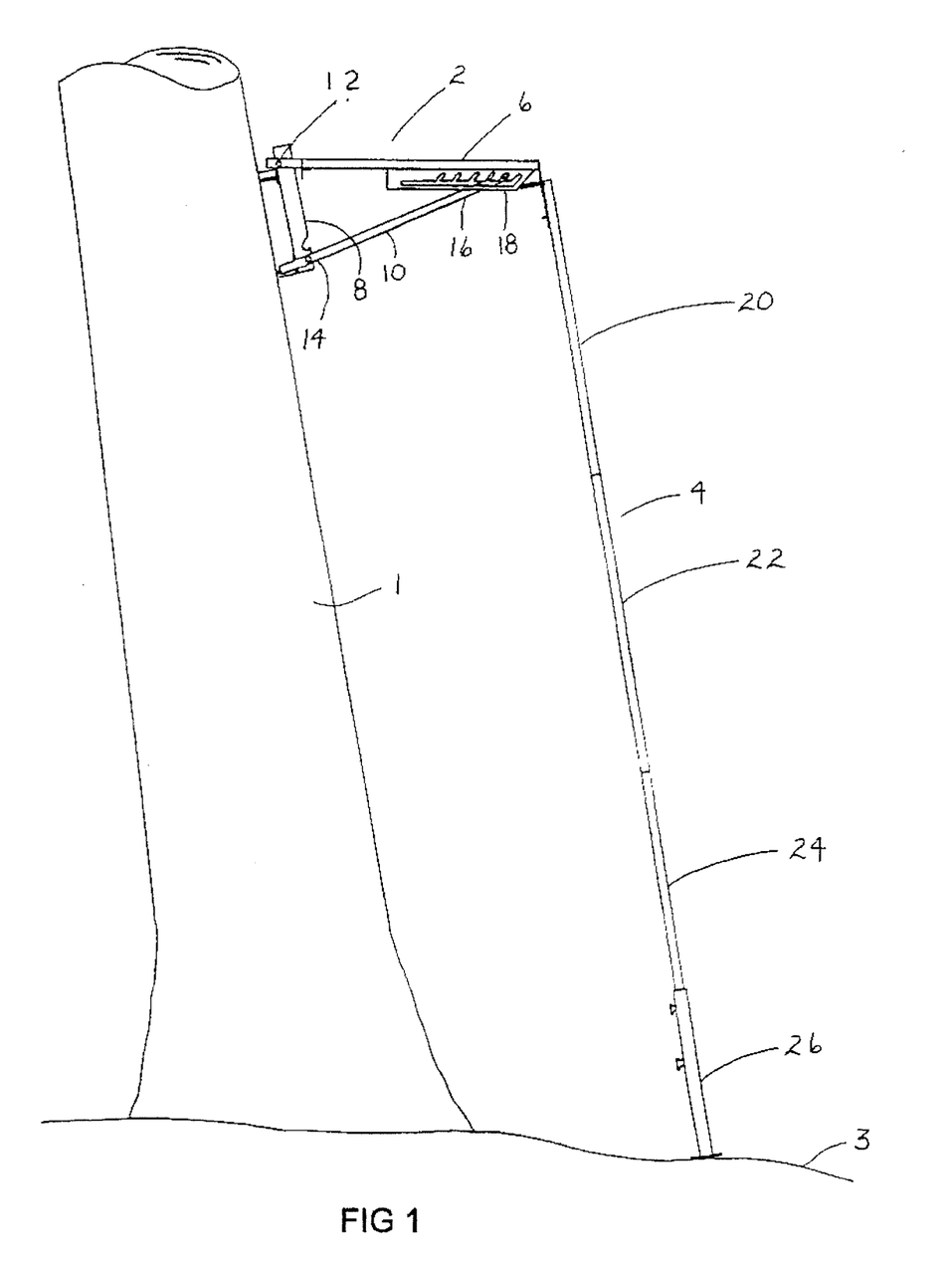
FIG. 1 is a side plan view of a hunter's tree stand according to the present invention, attached by screws to the trunk of a tree, with the ladder member in position for gaining access to the stand.
Figure 2:
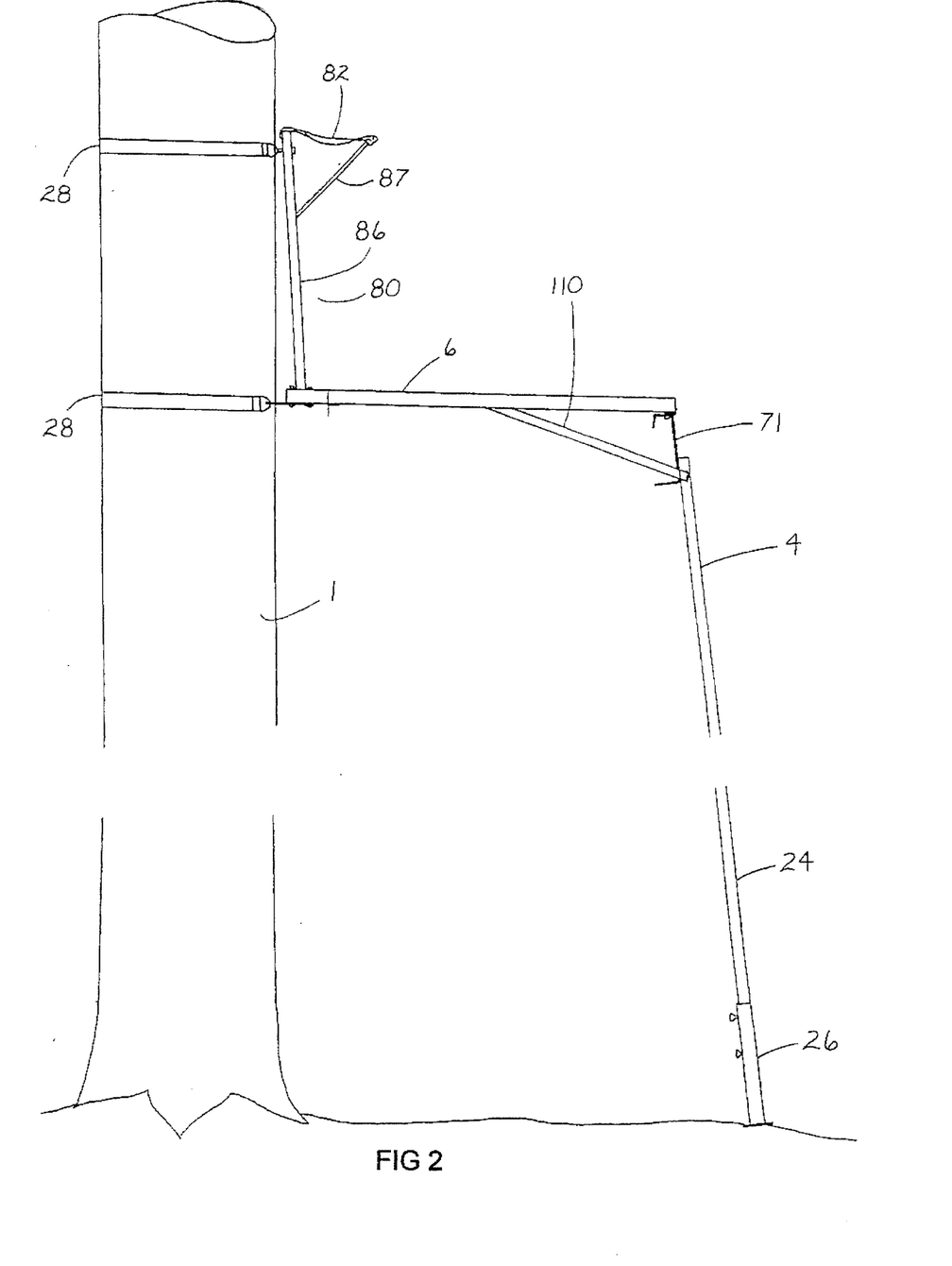
FIG. 2 is a side plan view of an alternative embodiment of the present invention configured to be used as a ladder stand and having a seat assembly positioned thereon.
Figure 3:
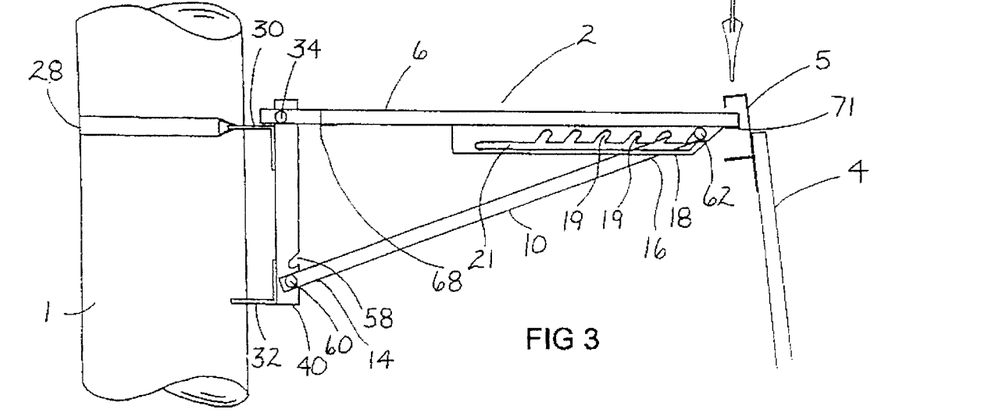
FIG. 3 is a side plan view of the preferred embodiment tree stand mounted by straps to a section of tree trunk and having the ladder member displaced from its temporary attachment to the stand.

Referring now to the drawings and in particular to FIG. 1, a hunter's tree stand 2 according to the preferred embodiment of the invention is shown attached to the tree trunk 1 with ladder 4 in place so that a hunter may ascend ladder 4 to reach platform 6 of tree stand 2. Platform 6 is mounted to mounting bracket 8 at pivot mounting 12. Supporting arm 10 is selectively mounted at first end 14 to mounting bracket 8. The opposing free end 16 of supporting arm 10 is selectively mounted to adjustment bracket 18 of platform 6. Ladder 4 comprises sections 20, 22 and 24 and extensions 26 and engages platform 6 while resting on ground 3.

Referring now to FIGS. 3–8, the tree stand 2 of the preferred embodiment can be visualized in more detail. Mounting bracket 8 is retained to tree trunk 1 by strap 28 which is detachably fixed to upper engaging plate 30 at its ends. Strap 28 may be a belt, chain, rope or other flexible link of sufficient length to pass around tree trunk 1 and be attached to upper engaging plate 30. Upper engaging plate 30 and lower engaging plate 32 are fixed to mounting bracket 8 such that mounting bracket 8 is maintained at a fixed distance from the tree trunk 1 in approximate parallel disposition to tree trunk 1.

Platform 6 is retained to mounting bracket 8 by rod 34 which is received by notch 36 formed on rear side 38 of each of bracket upright bars 40 and 42. This mounting structure allows platform 6 to be pivotable relative to mounting bracket 8. Upper engaging plate 30 is provided with free edges 29 and 31 which form a "V"-shaped indentation Similarly, lower engaging bracket 32 is provided with free edges 33 and 35 which join in a "V"-shaped indentation. Free edges 29, 31 and 33, 35 are engageable with tree trunk 1 when mounting bracket 8 is attached to tree trunk 1.

Figure 4:
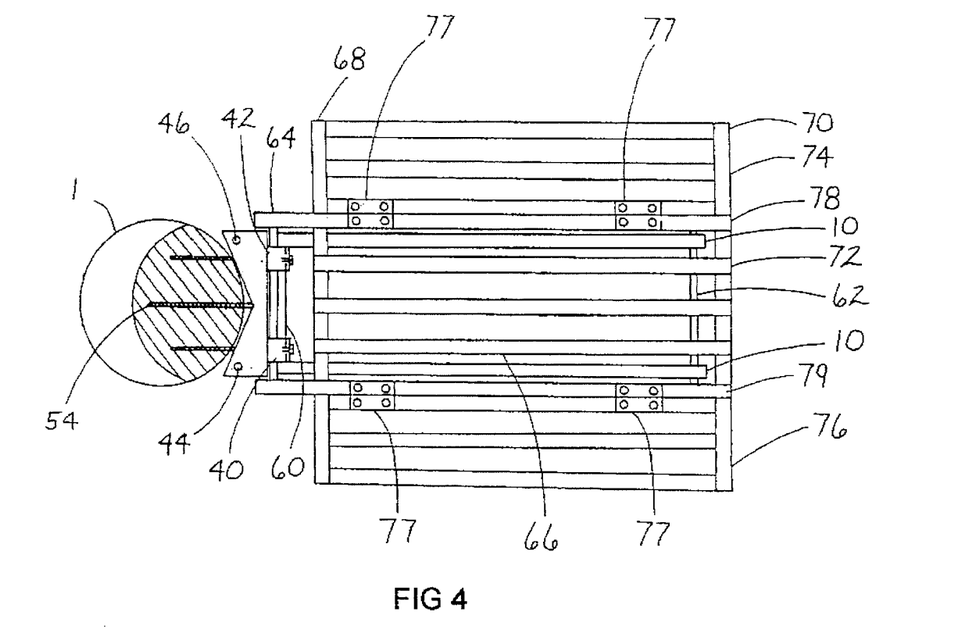
FIG. 4 is a top plan view of tree stand according to the present invention which is screw mounted to a tree trunk and which has its platform extension folded into position for use.
Figure 5:
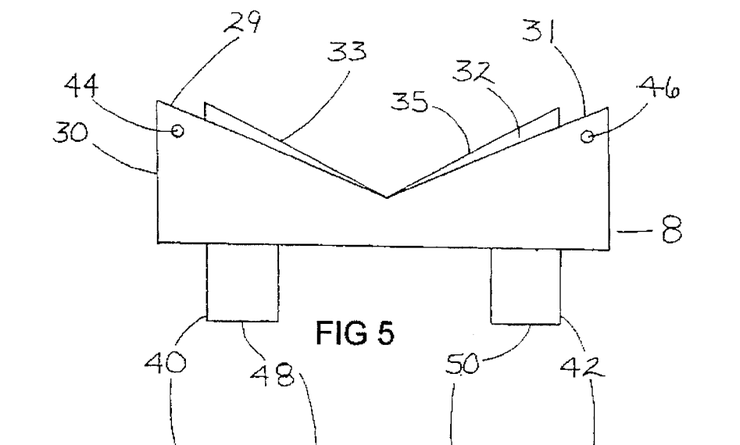
FIG. 5 is a top plan view of the mounting bracket member of the preferred embodiment tree stand.
Figure 6:
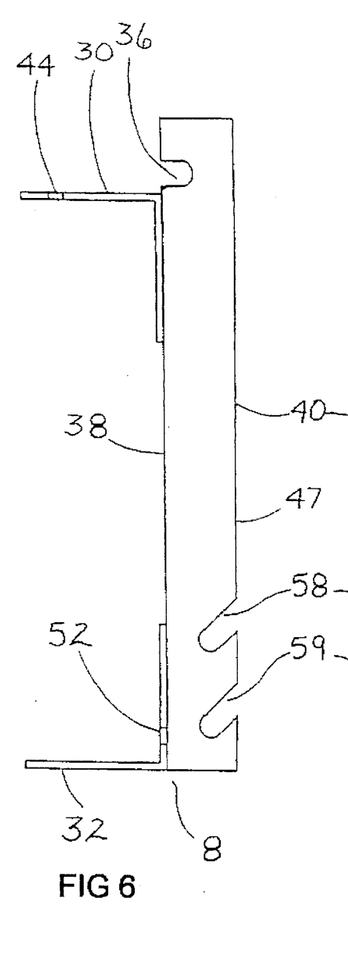
FIG. 6 is a side plan view of the mounting bracket of FIG. 5.
Figure 7:
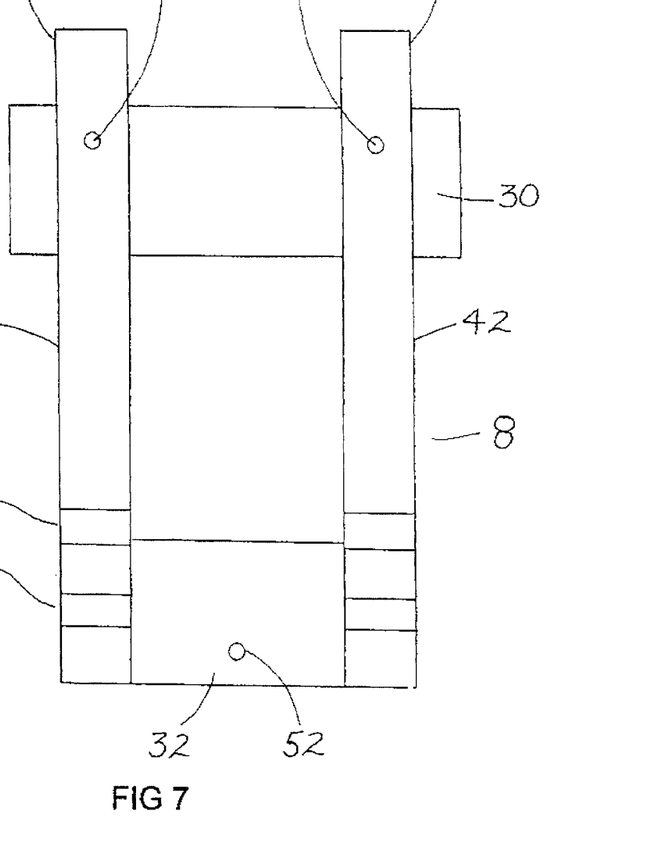
FIG. 7 is a front elevation of the mounting bracket of FIG. 5.
Figure 8:
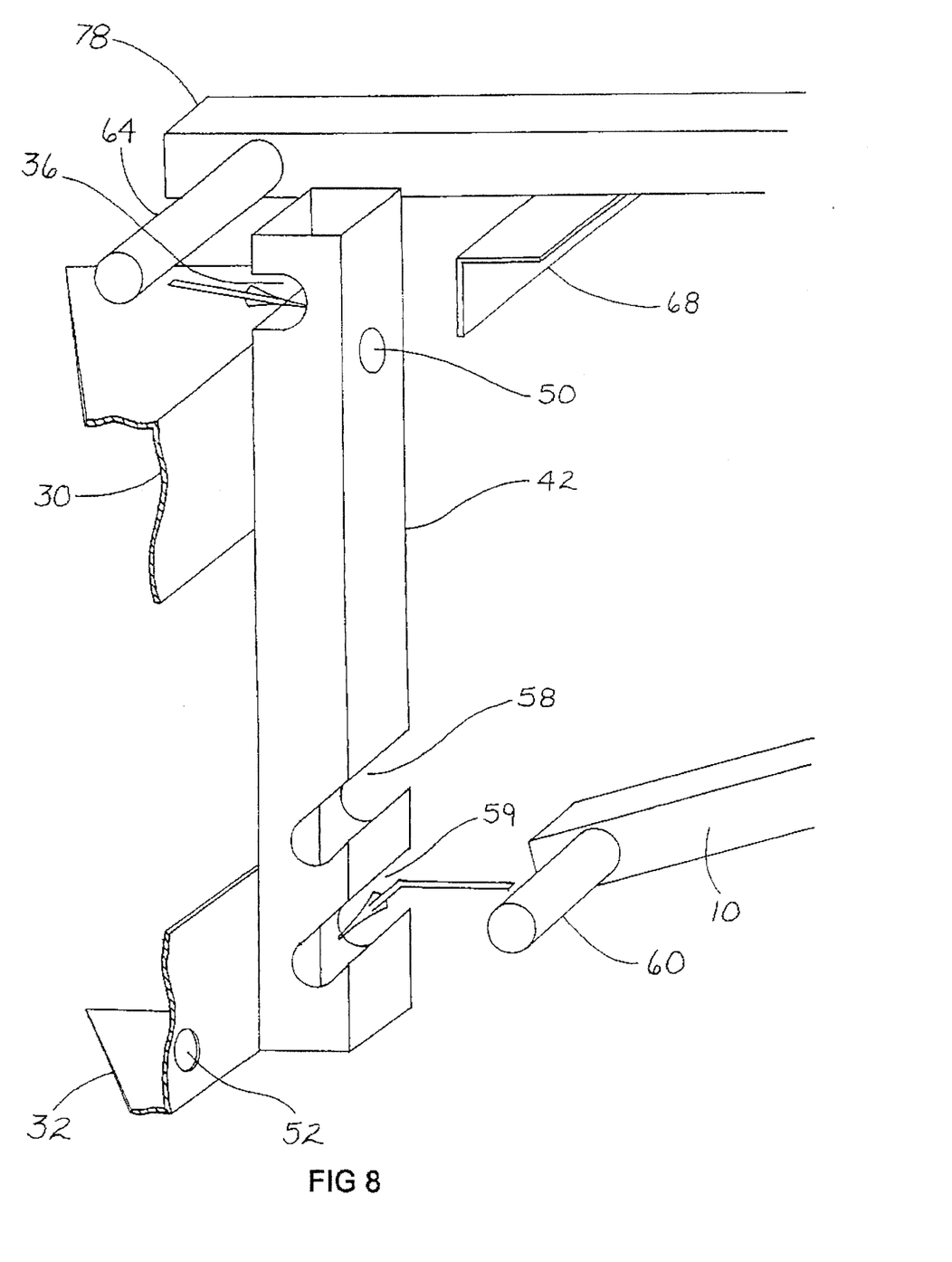
FIG. 8 is a close up left perspective view of parts of the mounting bracket and platform member of the preferred embodiment of the present invention showing the engagement of the platform to the mounting bracket.

Holes 44 and 46 in upper engaging plate 30 are provided to allow attachment of strap 28 thereto. Holes 48 and 50 of upper engaging plate 30 and hole 52 of lower engaging plate 32 are provided to allow attachment of bracket 8 by screws 54 into tree trunk 1, as illustrated in FIG. 4, if desired and permitted by applicable local law.

Platform 6 is provided with adjustment bracket 18 which contains a plurality of grooves 19 into which connecting pin 62 of free end 16 of supporting arm 10 may be selectively attached. Each of grooves 19 is a elongated downwardly disposed opening with an axis which is non perpendicular to platform 6 and slanted toward mounting bracket 8. A slot 21 is communicative with the open end of each groove 19. By selective placement of free end 16 of supporting arm 10, the relative angle between platform 6 and tree trunk 1 may be adjusted such that platform 6 may be made substantially horizontal when tree trunk 1 is not substantially vertical.

Also useful in allowing adjustment of the angle of platform 6 relative to tree trunk 1 are slots 58 and 59 which are formed on the front side 47 of bracket upright bars 40 and 42 and are disposed to selectively receive first rod 60 of first end 14 of supporting arm 10.

It may be seen that mounting bracket 8 comprises a pair of upright bars 40 and 42 maintained spatially separated by upper engaging plate 30 and lower engaging plate 32. Supporting arm 10 may be understood to comprise a pair of bar members interconnected at the first ends thereof by first rod 60 transversely fixed to first end 14 of each supporting arm 10 and connecting pin 62 transversely fixed to second ends 16 of supporting arms 10. Rod 60 therefore is selectively receivable in one of the slots 58 and 59 of upright bars 40 and 42 while connecting pin 62 is selectively receivable in one of slots 19 of adjustment bracket 18.

Platform 6 is illustrated in top view in FIG. 4 to comprise a plurality of generally parallel bars 66 affixed to a first frame member 68 and a second frame member 70. Platform 6 comprises a central section 72 and a pair of wing sections 74 and 76 which are designed to fold about hinges 77 into a closed position overlying central section 72 or to an open position wherein central section 70 and wing sections 74 and 76 are essentially co-planar. Platform 6 is provided with extending beams 78 and 79 which are mounted to first frame member 68 and second frame member 70 and extend toward mounting bracket 8 and are joined at their free ends by rod 64. Because rod 64 may be received in notches 36 of upright bars 40 and 42, platform 6 is pivotal relative to mounting bracket 8.

Ladder 4 is provided with hook bracket 5 which extends from the upper section 20 of ladder 4 to hook over first frame member 70 of platform 6 to afford stability to ladder 4.

Figure 9:
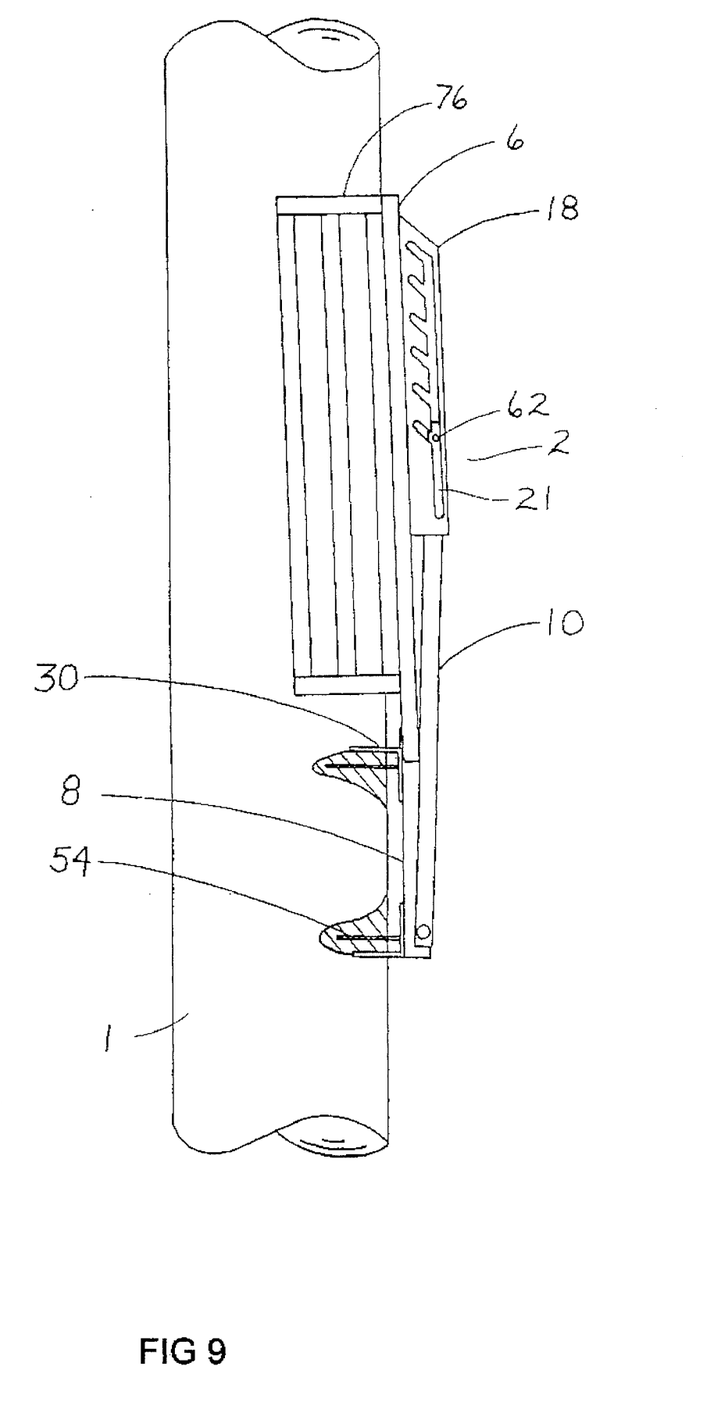
FIG. 9 is a side plan view of the tree stand of the preferred embodiment of the invention mounted to a tree trunk and folded into its stored position.

Referring to FIG. 9, the tree stand 2 according to the preferred embodiment is shown in its folded position against tree trunk 1. Wing sections 76 and 74 (not shown in FIG. 9) are folded relative to central section 72 of platform 6 such that platform 6 will generally embrace the tree trunk 1, thereby making tree stand 2 less visible, and therefore less likely to be trespassed upon or stolen. Supporting arm 10 has been folded upwardly about the axis of rod 60, and connecting pin 62 has been slid along slot 21 to help retain platform 6 adjacent to tree trunk 1. It can be seen that the novel design of tree stand 2 permits it to be folded upward against any tree trunk, whether substantially vertical or not, and to be placed in position for use by unfolding platform 6 toward a substantially horizontal configuration with support arm 10 positioned selectively upon adjustment bracket 18 to maintain and support platform 6 in a substantially horizontal position.

Figures 10, 11:
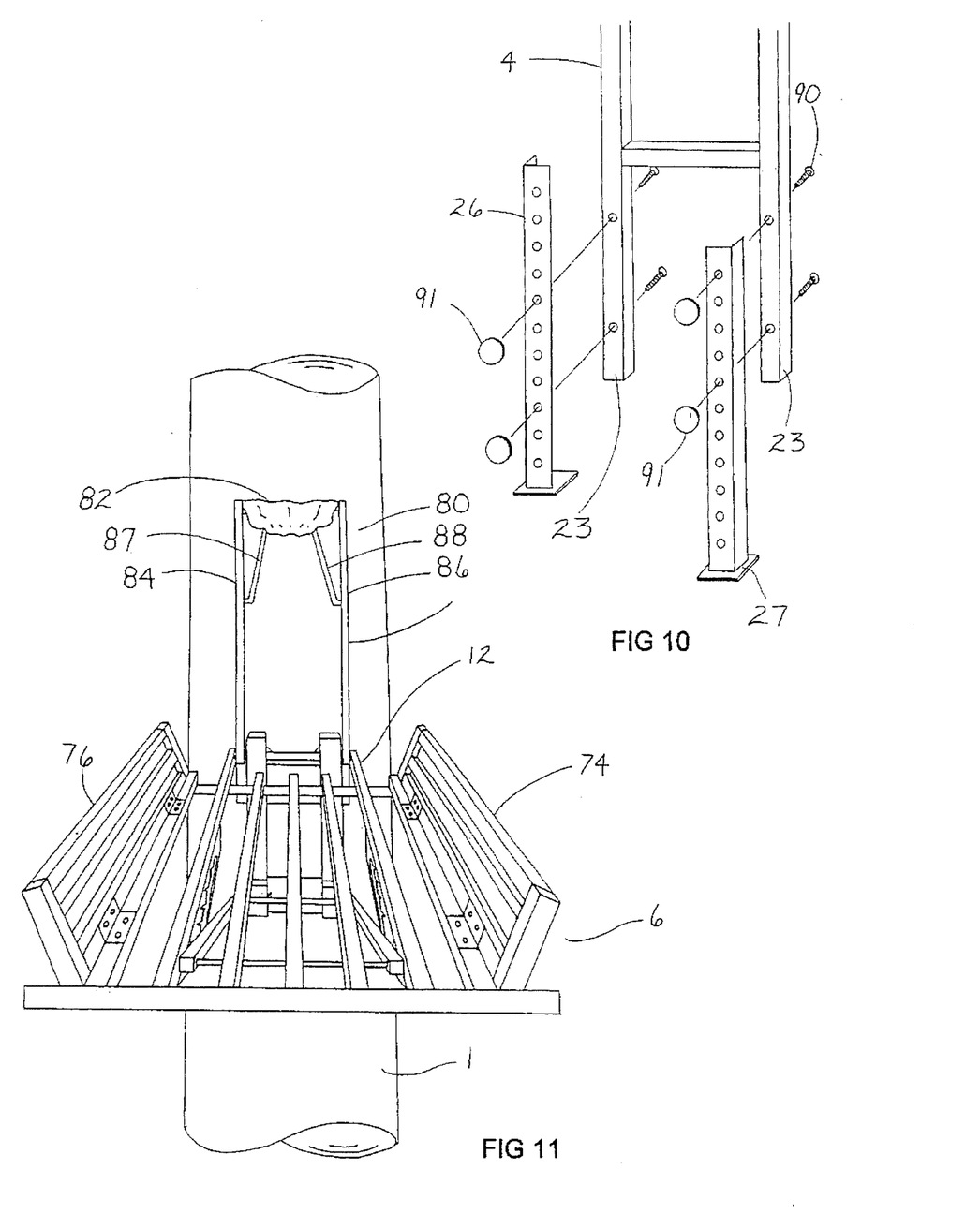
FIG. 10 is a partly exploded perspective view of the extension elements of the ladder member of the invention.
FIG. 11 is a front perspective view of the tree stand of the preferred embodiment of the invention with the optional seat assembly mounted to the mounting bracket and with the platform extensions partially folded.
Figures 12, 13:
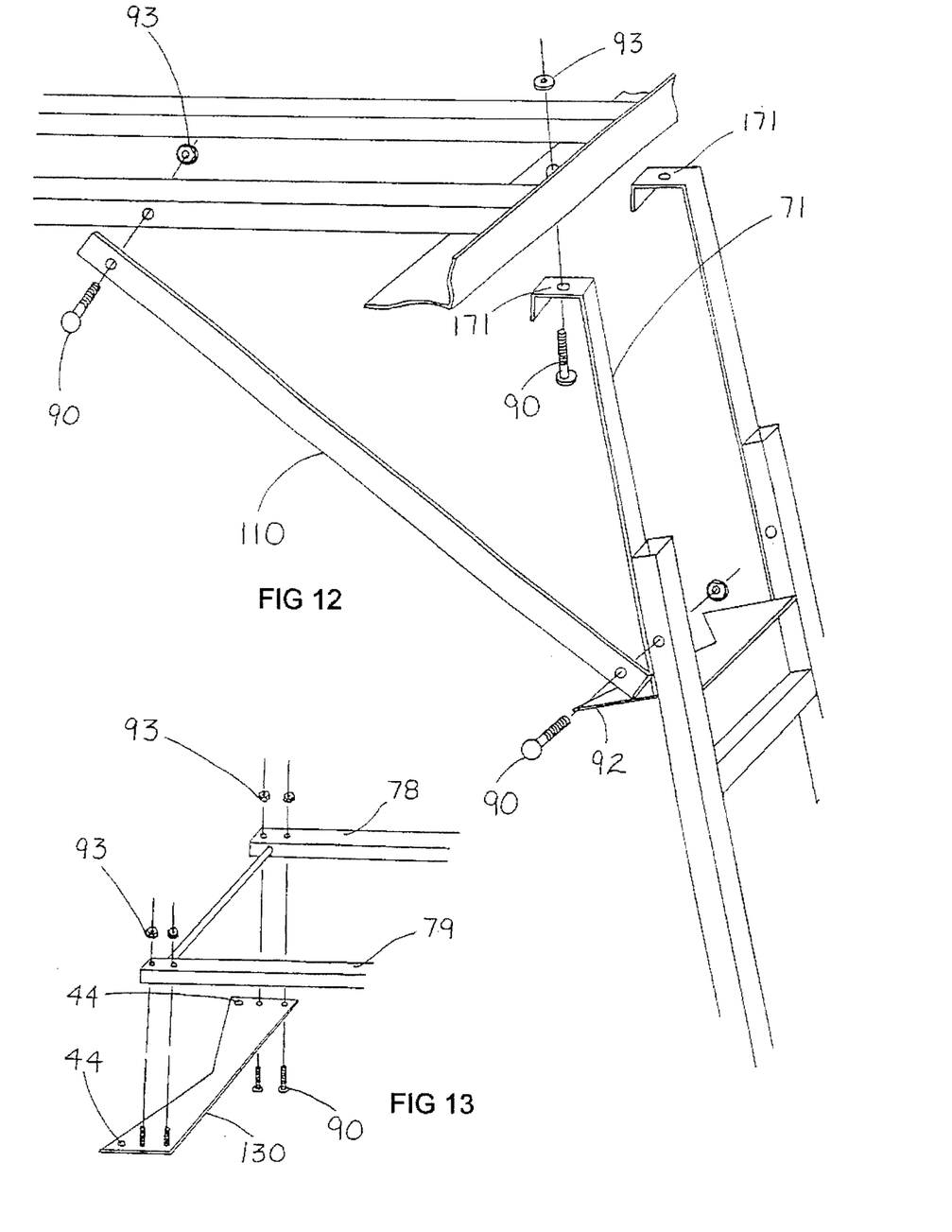
FIG. 12 is a left perspective view, partially exploded, of an alternative embodiment of the invention, showing the mounting of the ladder member to the platform and its supporting bracket.
FIG. 13 is a side perspective view of the tree engaging plate and its attachment to the platform member in the embodiment of the invention configured as a ladder stand.

FIG. 11 discloses the preferred embodiment tree stand 2 equipped with an optional seat member 80 which comprises seat 82 supported by vertical arms 84 and 86 and folding braces 87 and 88. Vertical arms 84 and 86 are provided with mounting openings to receive rod 64 of platform 6 which retains platform 6 to mounting bracket 8 at the upper end thereof. Seat 80 is of fabric or other flexible material to allow its easy folding or compression against tree trunk 1 when platform 6 is folded upward into its closed position. Wing sections 74 and 76 are shown in FIG. 11 in the partly folded position such that platform 6 will generally embrace tree trunk I when it is folded into touching engagement with tree trunk 1.

Figure 14:
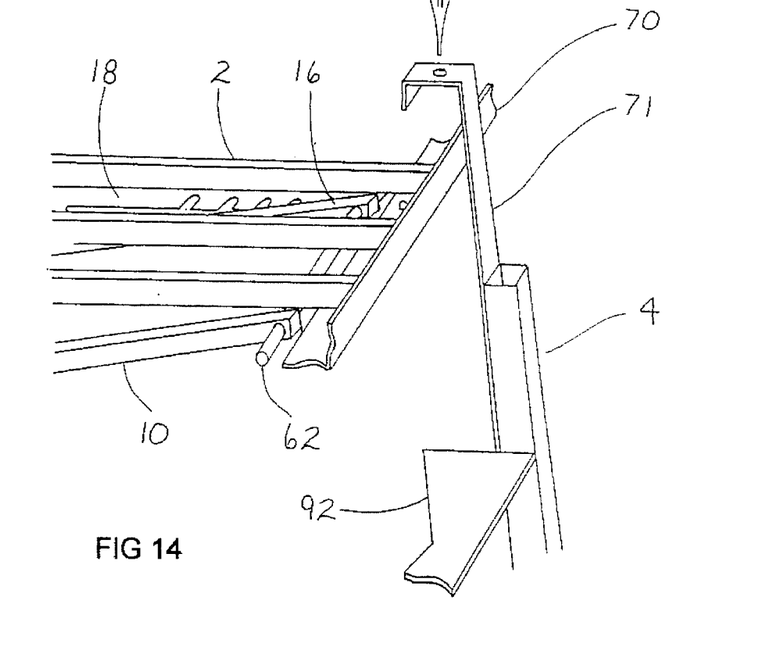
FIG. 14 is a side perspective view of the platform of the preferred embodiment showing the detachable ladder displaced from the platform.

FIGS. 10 and 14 provide further detail about the ladder 4 of the preferred embodiment. FIG. 10 discloses the extensions 26 which are selectively mountable to the lower ends of ladder legs 23 of ladder 4. Bolts 90 which engage threaded knobs 91 are used to mount extensions 26 as desired to ladder legs 23, such that one extension 26 may extend from one or the other of legs 23 further than the other so that the ladder 4 will stand essentially vertically when on uneven ground. Holes 25 afford a wide range of alternative mountings for extension 26 to legs 23 so that very uneven ground can be accommodated with ladder 4. Feet 27 on each of extensions 26 provide added stability by increasing the surface area in contact with the surface on which the ladder rests.

FIG. 14 illustrates the methodology for attachment of ladder 4 to tree stand 2 in the preferred embodiment. Hook extension 71 depends from the top of ladder 4 such that it may hook over first frame member 70 of platform 6, to provide engaging means to keep ladder 4 in place adjacent tree stand 2. By being easily detachable, ladder 4 may be removed from tree stand 2 when the user has finished hunting and may be carried from the area, thereby making it unfeasible for trespassers to use tree stand 2. In addition, ladder 4 may be moved adjacent to tree trunk 1 to allow the user access to fold platform 6 against tree trunk 1 as shown in FIG. 9. Offset rung 92 serves to engage the bark of tree trunk 1 and to displace ladder 4 a satisfactory distance from tree trunk 1 when the ladder 4 is placed against tree trunk 1.

Figures 15, 16:
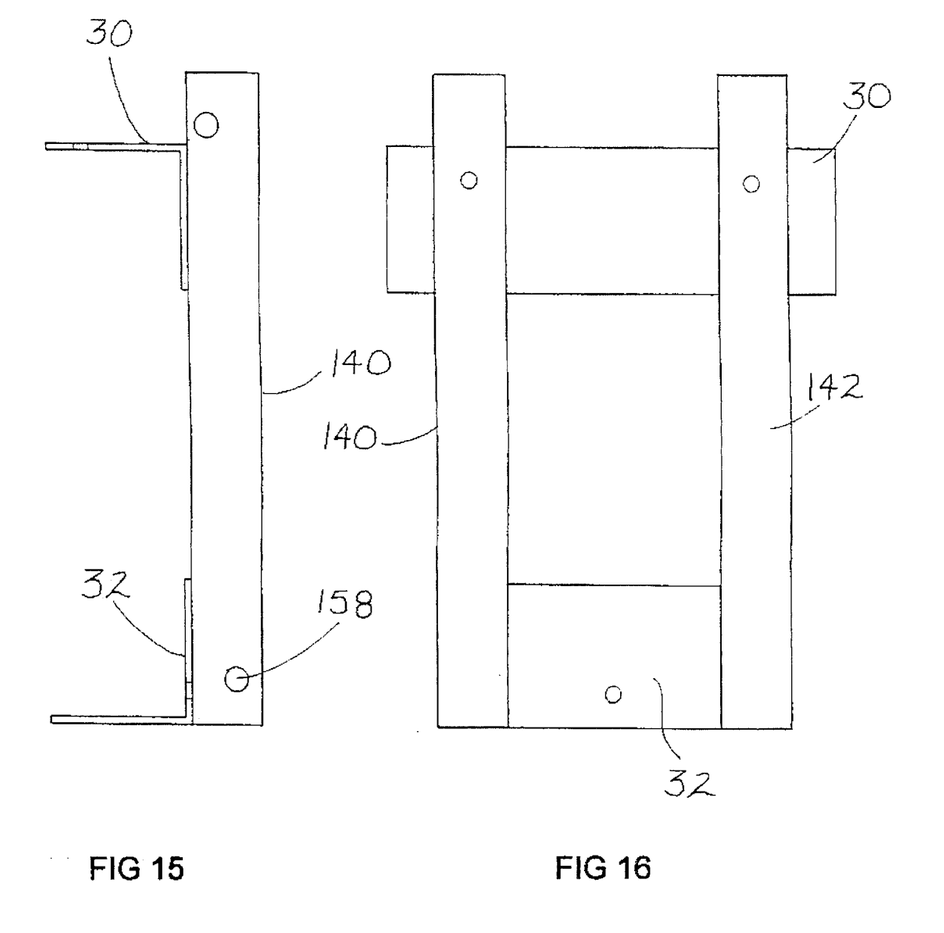
FIG. 15 is a side plan view of the mounting bracket of an alternative embodiment of the tree stand.
FIG. 16 is a front elevation of the mounting bracket of FIG. 15.
Figure 17:
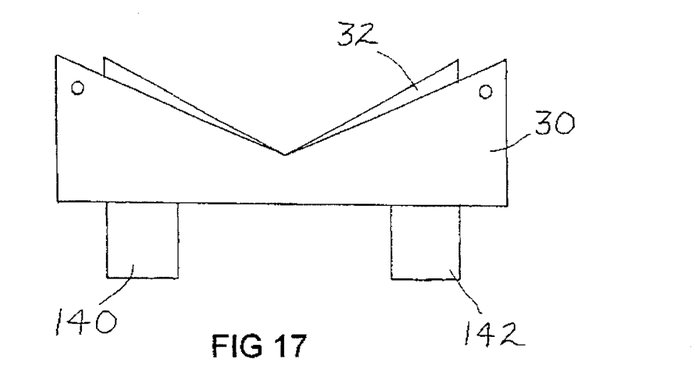
FIG. 17 is a top plan view of the mounting bracket shown in FIG. 15.
Figure 18:
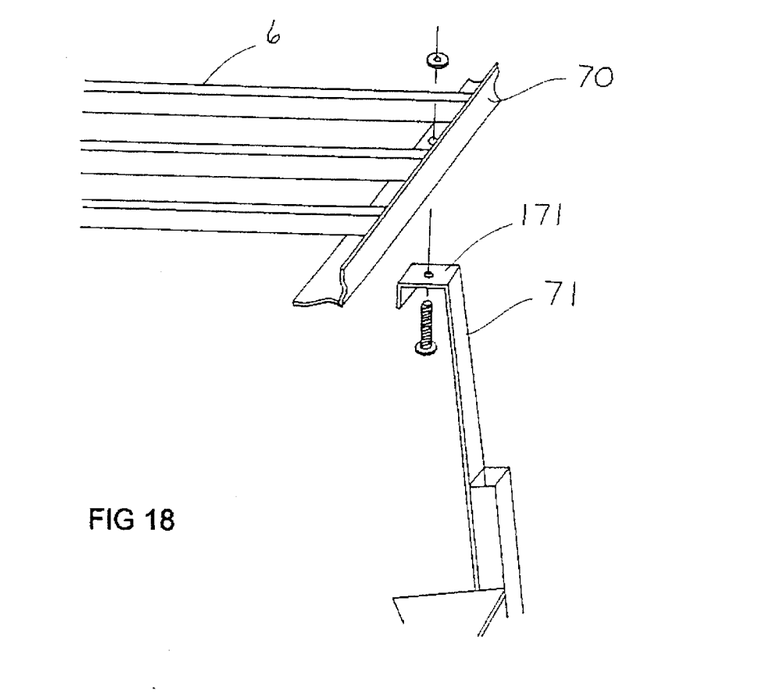
FIG. 18 is a perspective close up view of the mounting of the ladder member of an alternative embodiment of the invention.

FIGS. 15–17 disclose another embodiment of the mounting bracket wherein the platform 6 is not easily removed from mounting bracket 108. Upper engaging plate 30 and lower engaging plate 32 are fixed to bracket bars 140 and 142 as in the preferred embodiment. Bracket bars 140 and 142 are provided with holes 136 and 158 to receive rod 64 of platform 6 and connecting pin 62 of support arm 10 respectively. In this embodiment, platform 6 may still be leveled and pivoted about rod 64 and folded about the tree trunk to which it is attached. However, unlike the preferred embodiment, platform 6 may not be easily disconnected from bracket 108 and removed by the user between uses.

An alternative embodiment of the invention is disclosed in FIGS. 2, 12, 13, and 18. In this embodiment, platform 6 is attached to ladder 4 to provide a ladder stand, that is, a hunter's elevated platform which includes a fixed ladder and which rests against a tree and is retained thereto. In this embodiment, platform 6 is securely mounted to hook extension 71 of ladder 4 by bolts 90 and nuts 93 such that hook 1 71 of hook extension 71 abuts the lower surface 106 of platform 6 and mounts to first frame member 70. Braces are fixed between ladder 4 and platform 6. The optional seat assembly 80 is mounted to platform 6 and straps 28 are used to retain platform 6 and seat assembly 80 to tree trunk 1. Tree engaging plate 130 is bolted to platform extending beams 78 and 79 and holes 44 are provided to attach to strap 28. Ladder 4 comprises mating sections 20, 22, and 24 and extensions 26.

I claim:

1. A stand to support a hunter in a tree comprising a mounting bracket attachable along the tree trunk at a desired location, a platform member pivotably mounted to the mounting bracket, a support arm having a first end and a second end, pivotably mounted to the mounting bracket at its first end, the platform member having an upper surface and a lower surface, the lower surface of said platform member having a multiplicity of attachment means thereupon, said second end of the support arm selectively attachable to one of said multiplicity of attachment means, said mounting bracket comprising a pair of upright bars disposed a fixed distance apart, each bar having a tree facing side and an opposing side, said mounting bracket having an upper end and a lower end, said tree facing sides of said upright bars each having a transverse recess thereupon along the upper ends of said upright bars, said platform member having a transverse bar receivable within said recesses.

2. The stand of claim 1 wherein said upright bars having a plurality of transverse notches upon said opposing sides along the lower ends thereof, said first end of said support arm selectively receivable in one of said plurality of notches on said upright bars.

3. The stand of claim 2 wherein said arm comprises a pair of spaced apart bars, said spaced apart bars are joined at the ends thereof by rod members, one of said rod members selectively receivable in said notches of said upright bars, the other of said rod members selectively attachable to said attachment means of said platform member.

4. The stand of claim 3 wherein said multiplicity of attachment means of said platform member comprises a bracket having a plurality of elongate notches therealong, said elongate notches open at the lower ends thereof, said other of said rods of said support arm selectively receivable in one of said elongate notches.

5. The stand of claim 4 wherein said bracket of said platform includes an elongate slot therealong, said slot communicates with the open ends of each of said notches of said bracket of said platform, said other of said rod members of said support arm slideable along said slot and retained therein when said other of said rod members is displaced from said plurality of elongate notches.

6. The stand of claim 2 wherein said platform having a central section and a pair of wing sections, P1 said wing sections hingedly mounted to said central section, said wing sections having a first position substantially co-planer with said central section, said wing sections having a second position wherein the planes of said wing sections intersect the plane of said central section at an acute angle.

* * * * *